(12) United States Patent
Shih-Tsung

(10) Patent No.: US 7,057,885 B2
(45) Date of Patent: Jun. 6, 2006

(54) LOCKING MECHANISM FOR A PERSONAL COMPUTER

(75) Inventor: Cheng Shih-Tsung, Taipei (TW)

(73) Assignee: Shuttle Inc. (TW)

( * ) Notice: Subject to any disclaimer, the term of this patent is extended or adjusted under 35 U.S.C. 154(b) by 255 days.

(21) Appl. No.: 10/752,443

(22) Filed: Jan. 5, 2004

(65) Prior Publication Data

US 2004/0261472 A1    Dec. 30, 2004

(30) Foreign Application Priority Data

Jan. 6, 2003    (TW) .............................. 92200152 U

(51) Int. Cl.
*H05K 5/00*    (2006.01)
(52) U.S. Cl. ..................... 361/679; 361/683
(58) Field of Classification Search ................ 361/679, 361/683
See application file for complete search history.

(56) References Cited

U.S. PATENT DOCUMENTS 5,408,212 A * 4/1995 Meyers et al. .............. 340/427

* cited by examiner

*Primary Examiner*—Yean Hsi Chang
(74) *Attorney, Agent, or Firm*—Fenwick & West LLP

(57) ABSTRACT

A locking mechanism for a personal computer is installed over a screw that is used to secure a moveable panel of the computer's chassis in a closed position. When installed, the locking mechanism prevents access to the screw, thereby preventing an unauthorized person from opening the panel of the chassis and having access to the contents therein. In one embodiment, the locking mechanism includes a lock base for receiving the screw and a lock head for being positioned over the lock base to cover and prevent access to the screw.

8 Claims, 2 Drawing Sheets

LOCKING MECHANISM FOR A PERSONAL COMPUTER

CROSS REFERENCE TO RELATED APPLICATIONS

This application claims the right of priority based on Taiwan application Ser. No. 092200152, filed on Jan. 6, 2003, which is herein incorporated in its entirety by reference.

BACKGROUND

1. Field of the Invention

The invention relates to locking systems for securing personal computers.

2. Background of the Invention

Locks have a long history of application in securing personal property against theft and other unauthorized use. Reflecting their diverse applications, locks of varying styles have been designed for various applications. One such application is to secure personal computers and the components and information stored within them from theft and vandalism.

Existing locks for personal computers are generally designed to safeguard the valuable item as a whole, instead of the components inside. But the internal components of a computer are often far more valuable than the computer chassis, and because of their relative size, the internal components may be more likely to be stripped from a computer and stolen rather than the entire computer stolen. For example, personal computers often have a removable panel fixed in a closed position by screws, allowing maintenance and servicing of the computer inside. By simply removing these screws, a thief can gain access to the inside of the computer and take valuable components from it—even if the motherboard were fastened to a chassis that is securely locked to a stationary object, such as a desk. The owner can sustain a huge loss in assets due to this oversight. Accordingly, locks designed to safeguard the computer as a whole, instead of the components inside the computer, are insufficient to protect the valuable property of computer owners.

SUMMARY OF THE INVENTION

Accordingly, the invention provides a way to secure the internal components of computer equipment, for example, by preventing the opening of a computer chassis. To prevent access to inside a computer, a locking mechanism is installed over a screw that is used to secure a moveable panel of the computer chassis in a closed position. When installed, the locking mechanism prevents access to the screw, thereby preventing an unauthorized person from opening the panel of the chassis and having access to the contents therein. An authorized user, however, can open the chassis by unlocking the locking mechanism and removing it from the screw.

In one embodiment, the locking mechanism is used to lock a personal computer that has a movable panel secured by a screw that allows access to inside the computer. The locking mechanism includes a lock base and a lock head. The lock base includes a rear panel with a opening for accommodating the screw and two opposing wing panels each with an opening, the lock base configured to receive the screw through the opening of the rear panel when the screw is secured to the panel of the personal computer. Configured to attach to the lock base, the lock head includes a latch that is moveable between a closed position and an open position. When the screw is secured to the panel of the personal computer through the lock base and the latch of the lock head is in the open position, the lock head can be positioned over the lock base to cover and prevent access to the screw. Once positioned in this way, the latch of the lock head can be moved into the closed position to prevent the lock head from being removed from the lock base, thereby preventing access to the screw and the computer from being opened.

DETAILED DESCRIPTION OF THE PREFERRED EMBODIMENTS

Figure 1:
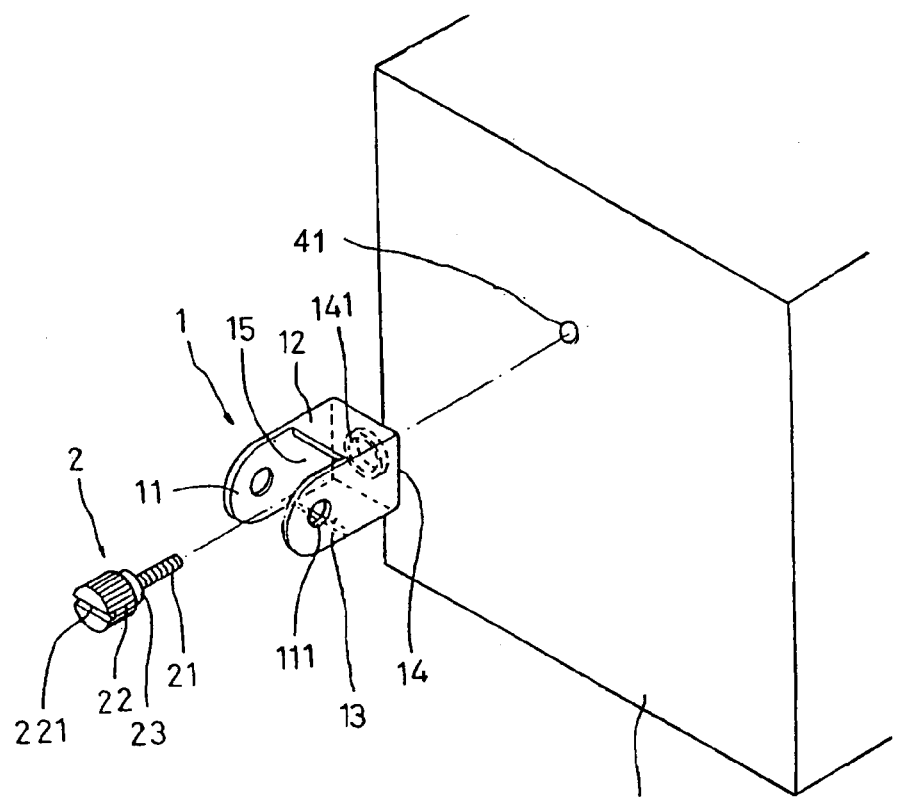
FIG. 1 is an exploded view of a portion of a locking mechanism for a computer chassis, in accordance with an embodiment of the invention.
Figure 2:
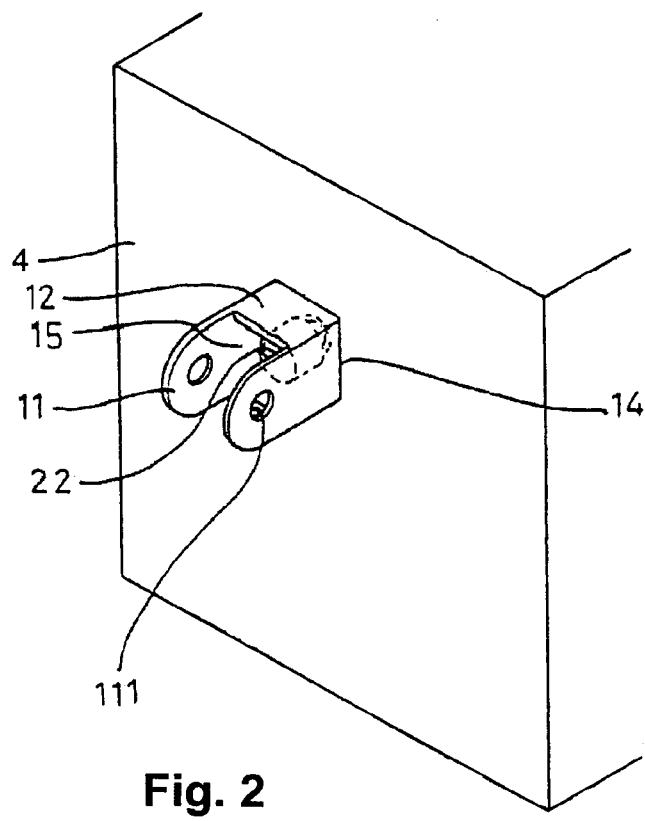
FIG. 2 is a view of a potion of a locking mechanism for a computer chassis, in accordance with an embodiment of the invention.

FIGS. 1 and 2 show a disassembled and an assembled view, respectively, of part of a locking mechanism for a computer chassis in accordance with an embodiment of the invention. The locking mechanism is for securing a computer chassis having a cover or panel 4, which a user can open to gain access to any components inside the computer. In one embodiment, the panel 4 is the rear panel of a computer chassis. The panel 4 includes a screw hole 41, through which a screw 2 is attached to the computer chassis to secure the panel 4 in a closed position, denying access to the insides of the computer. To open the panel 4 and gain access to any components inside the computer, therefore, a user must first remove the one or more screws 2 from the hole 41.

In accordance with an embodiment of the invention, a locking mechanism comprises a lock base 1, a screw 2, and a lock head 3. Although the lock base 1 can take many forms, in one design the lock base 1 includes two wing panels 11, an upper panel 12, a bottom panel 13, and a rear panel 14. The two wing panels 11 each have a hole 111 for accommodating a latch. The upper panel 12 and the bottom panel 13 may be shorter (i.e., extend from the rear panel 14 a shorter distance) than the wing panels 11 and do not reach the holes 111 in the wing panels 11. The rear panel 14 of the lock base 1 has an opening 141, preferably not tapped for a screw, through which the screw 2 can be passed to reach the screw hole 41 in the panel 4.

The wing panels 11, the upper panel 12, the bottom panel 13, and the rear panel 14 form a chamber 15 for holding the screw head 22 of the screw 2. In one embodiment, these parts of the lock base 1 form a chamber 15 that is closed from the side, thereby preventing access to the screw head 22—and thus turning of the screw 2— from the side. The lock base 1 can be formed, for example, by folding a metal sheet as a whole, or by die-casting.

For convenience of use, the lock base 1 can be attached to the panel 4 over the hole 41, for example, by soldering, welding, or a suitable adhesive. In this way, the lock base 1 stays in place during installation and removal of the lock. In an alternative embodiment, the lock base 1 is not attached to any panel or any computer chassis. This allows the lock base 1 to be used with a number of different types of computer equipment, so the locking mechanism described herein can be compatible with existing computer equipment not specifically designed therefor.

In one embodiment, the screw 2 comprises a screw head 22 and a threaded bolt 21 and is made from metal. As described above, the bolt 21 is smaller than the opening 141 in the lock base rear panel 14 so that it can be passed through the opening 141, and the screw head 22 is larger than the opening 141 so the screw 2 will secure the lock base 1 in place. The screw 2 is designed to screw into the hole 41 of the panel 4 to lock the panel 4 in a closed position, thereby denying access to the inside of the computer. A slot, cross, hexagon, or other suitable socket 221 is grooved on top of the screw head 22 to facilitate turning and installation of the screw 2 using a tool, such as a screwdriver. The screw 2 may also include a washer 23 to keep the screw 2 in place when installed.

Figure 3:
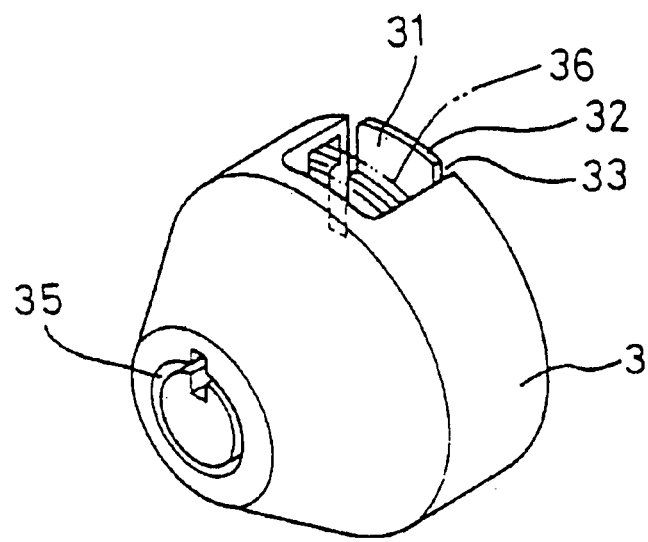
FIG. 3 is a view of a lock head for securing a computer chassis, in accordance with an embodiment of the invention.
Figure 4:
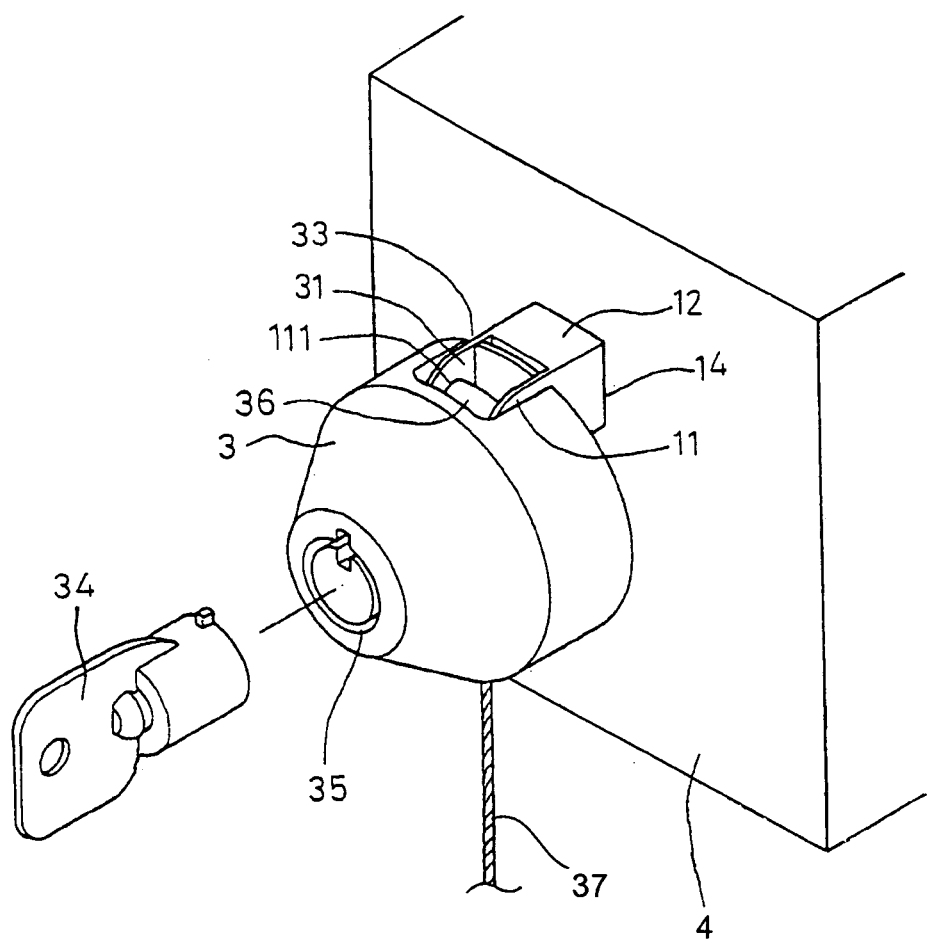
FIG. 4 is a view of a locking mechanism installed on a computer chassis, in accordance with an embodiment of the invention.

FIG. 3 shows a lock head 3 in accordance with one embodiment of the invention. The lock head 3 is designed to attach to the lock base 1 to prevent access to the screw 2 and thus opening of the panel 4. In one embodiment, the lock head 3 comprises knob-shaped body that has a slot 31 formed therein, a movable latch 36, and a key hole 35. The movable latch 36 is activated through application of a matching key 34 in the key hole 35. The slot 31 is wider than the distance between the two wing panels 11 of the lock base 1 to allow the lock head 3 to fit over the lock base 1. The lock head further comprises a baffle plate 32 sized to match the chamber 15 of the lock base 1 and cover the screw head 22 when installed. Accordingly, in combination with the lock base 1, this baffle plate 32 covers the chamber 15 and prevents any access to the screw 2. Two gaps 33 between the baffle plate 32 and the inner wall of the slot 31 allow the two wing panels to be located in the gaps 33 when the locking mechanism is installed. FIG. 4 shows the lock head 3 installed on the lock base 1 to prevent access to the screw 2 and prevent opening of the panel 2. In one embodiment, the lock head 3 includes a locking cable 37 for fixing the entire device, for example, to a desk or other stationary object.

To install the locking mechanism, the opening 141 of the lock base 1 is aligned with the screw hole 41 of the panel 4. The bolt 21 of the screw 2 is then passed through the through the opening 141 in the lock base 1 and screwed into the screw hole 41 of the panel 4. These steps are illustrated in FIGS. 1 and 2. The screw 2 can be screwed into the hole 41 using a screwdriver turning the socket 221. In this way, the lock base 1 is attached to the panel 4, which is fixed in the closed position. When installed as described above, the screw head 22 is located in the chamber 15, as shown in FIG. 2.

To prevent access to and removal of the screw 2, the lock head 3 is then installed over the lock base 1 and screw head 22. Before installation, the latch 36 is placed in an open position to allow the lock head 3 to be placed over the lock plate 1. To open or close the latch 36, a key 34 is inserted into the key hole 35 and turned. When the lock head 3 is mounted on the lock base 1, the wing panels 11 slide in the gaps 33, and the baffle plate 32 block the front opening of the chamber 15. To secure the lock head 3 in this position, the latch 36 is activated so that it passes through the holes 111 in the wing panels 11. In this way, the lock head 3 cannot be removed from the lock base 1. When the latch 36 in the lock head 3 is positioned through the holes 111 in the wing panels 11, it is impossible to remove the screw 2 from the screw hole 41 until the lock head 3 is again removed. For example, the baffle plate 32 and lock base 1 together prevent access to the screw 2, even by using a tool such as a screwdriver or by turning the lock base 1. This effectively prevents thieves from opening the computer chassis and taking the components therein.

The foregoing description of the embodiments of the invention has been presented for the purposes of illustration and description. It is not intended to be exhaustive or to limit the invention to the precise forms disclosed. Persons skilled in the relevant art can appreciate that many modifications and variations are possible in light of the above teaching. It is therefore intended that the scope of the invention be limited not by this detailed description, but rather by the claims appended hereto.

I claim:

1. A locking mechanism for a personal computer that has a movable panel for allowing access to inside the computer, the panel secured by a screw, the locking mechanism comprising:
    a lock base that includes a rear panel with an opening for accommodating the screw and two opposing wing panels each with an opening, the lock base configured to receive the screw through the opening of the rear panel when the screw is secured to the panel of the personal computer; and
    a lock head for attaching to the lock base, the lock head including a latch that is moveable between a closed position and an open position;
    wherein when the screw is secured to the panel of the personal computer through the lock base and the latch of the lock head is in the open position, the lock head is positionable over the lock base to cover and prevent access to the screw, the latch of the lock head thereafter being moveable into the closed position to prevent the lock head from being removed from the lock base.

2. The locking mechanism of claim 1, wherein when the locking mechanism is installed and the latch is in the closed position, the latch passes through the openings in each of the wing panels.

3. The locking mechanism of claim 1, wherein the lock base is attached to the panel of the personal computer.

4. The locking mechanism of claim 1, wherein lock base further includes opposing lateral panels that, combined with the wing panels, form a chamber in which a head of the screw is located when the locking mechanism is installed, the lateral and wing panels thereby preventing access to the screw from a direction parallel to the panel of the personal computer.

5. The locking mechanism of claim 1, wherein the lock head further includes a baffle plate that covers a head of the screw.

6. The locking mechanism of claim 1, wherein a slot is formed in the lock head, the slot being wider than the distance between the wing panels of the lock base to allow the lock head to fit over the lock base.

7. The locking mechanism of claim 1, further comprising a key for coupling to the lock head and moving the latch between the open and closed positions.

8. The locking mechanism of claim 1, wherein the lock head further includes a cable for being fastened to a fixture.

* * * * *